United States Patent
Iwatani et al.

(10) Patent No.: US 11,654,708 B2
(45) Date of Patent: May 23, 2023

(54) PRINTING PAPER

(71) Applicant: YUPO CORPORATION, Tokyo (JP)

(72) Inventors: Nobuhiro Iwatani, Ibaraki (JP); Tatsuya Suzuki, Ibaraki (JP); Hideyuki Imai, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 178 days.

(21) Appl. No.: 17/209,787

(22) Filed: Mar. 23, 2021

(65) Prior Publication Data
US 2021/0300101 A1 Sep. 30, 2021

(30) Foreign Application Priority Data
Mar. 27, 2020 (JP) .............................. JP2020-057384

(51) Int. Cl.
*B41M 5/50* (2006.01)
*C08L 23/12* (2006.01)
(Continued)

(52) U.S. Cl.
CPC ............ *B41M 5/502* (2013.01); *B32B 27/205* (2013.01); *B32B 27/32* (2013.01); *C08J 5/18* (2013.01); *C08L 23/12* (2013.01); *B32B 2250/03* (2013.01); *B32B 2264/303* (2020.08); *B32B 2307/75* (2013.01); *C08J 2323/12* (2013.01);
(Continued)

(58) Field of Classification Search
CPC ........ B41M 5/502; B41M 5/506; B41M 5/52; C08J 2323/12; C08J 2423/12; C08J 5/18; C08L 2203/16; C08L 2205/025; C08L 23/12; B32B 2250/03; B32B 2250/242; B32B 2264/104; B32B 2264/302; B32B 2264/303; B32B 2264/402;
(Continued)

(56) References Cited

U.S. PATENT DOCUMENTS

2010/0159776 A1* 6/2010 Jones ...................... B32B 27/20
442/394
2012/0177907 A1* 7/2012 Koike .................... B32B 27/08
428/304.4

FOREIGN PATENT DOCUMENTS

| CN | 109012218 A | * | 12/2018 | ........... B01D 46/525 |
| EP | 3424732 A1 | * | 1/2019 | .......... B41J 11/0015 |
| JP | 2000-131870 | | 5/2000 | |

OTHER PUBLICATIONS

Translation of CN 109012218 A, Chen et al., Dec. 2018. (Year: 2018).*

(Continued)

*Primary Examiner* — Hai Vo
(74) *Attorney, Agent, or Firm* — Greenblum & Bernstein, P.L.C.

(57) ABSTRACT

A printing paper having a base layer, an intermediate layer, and a surface layer, the intermediate layer being arranged adjacent to the base layer and on the base layer, and the surface layer being arranged adjacent to the intermediate layer and on the intermediate layer, the base layer, the intermediate layer, and the surface layer each being a thermoplastic resin film having pores, an average pore size of the surface layer being from 0.2 to 5 μm, an average pore size of the intermediate layer being from 5 to 70 μm and being greater than the average pore size of the surface layer, and an average pore size of the base layer being from 70 to 200 μm and being greater than the average pore size of the intermediate layer.

5 Claims, 3 Drawing Sheets

(51) Int. Cl.
  *C08J 5/18* (2006.01)
  *B32B 27/20* (2006.01)
  *B32B 27/32* (2006.01)

(52) U.S. Cl.
  CPC ....... *C08J 2423/12* (2013.01); *C08L 2203/16* (2013.01); *C08L 2205/025* (2013.01)

(58) Field of Classification Search
  CPC .......... B32B 2307/732; B32B 2307/75; B32B 27/08; B32B 27/205; B32B 27/32; C08K 3/013
  See application file for complete search history.

(56) References Cited

OTHER PUBLICATIONS

Translation of CN 109012218 A, Chen et al., Dec. 18, 2018. (Year: 2018).*

* cited by examiner

PRINTING PAPER

CROSS-REFERENCE TO RELATED APPLICATIONS

This application claims priority under 35 U.S.C. 119 to Japanese Application No. 2020-057384, filed Mar. 27, 2020. The entire teachings of the above application are incorporated herein by reference.

BACKGROUND OF THE INVENTION

Field of the Invention

The present invention relates to printing paper.

Description of the Related Art

For printing on printing paper, various inks, such as water-based inks, oil-based inks, and ultraviolet curable inks, are used. The ink is fixed to paper by infiltration of its solvent component into the paper or by curing of the ink on the surface of the paper. As printing paper, synthetic paper using a resin film has been used in addition to pulp paper in the related art (e.g. see JP 2000-131870 A).

When printed materials each obtained by printing on both sides of synthetic paper using an oil-based ink are stacked and stored, a phenomenon called gloss ghosting may occur. When gloss ghosting occurs, coloring performance in a part of the printed image is deteriorated, and the quality of the printed material is deteriorated.

An object of the present invention is to provide printing paper causing little gloss ghosting.

SUMMARY OF THE INVENTION

As a result of diligent research to solve the problem described above, the inventors of the present invention found that the problem described above can be solved by, in printing paper having a multilayer structure, setting the average pore size of each layer of printing paper to a particular range, and thus completed the present invention.

In other words, embodiments of the present invention are as follows.

(1) A printing paper having a base layer, an intermediate layer, and a surface layer, the intermediate layer being arranged adjacent to the base layer and on the base layer, and the surface layer being arranged adjacent to the intermediate layer and on the intermediate layer, the base layer, the intermediate layer, and the surface layer each being a thermoplastic resin film having pores, an average pore size of the surface layer being from 0.2 to 5 µm, an average pore size of the intermediate layer being from 5 to 70 µm and being greater than the average pore size of the surface layer, and an average pore size of the base layer being from 70 to 200 µm and being greater than the average pore size of the intermediate layer.

(2) The printing paper according to (1) above, where the intermediate layer contains fillers having a maximum particle size of 5 µm or greater.

(3) The printing paper according to (1) or (2) above, where the intermediate layer contains two or more types of thermoplastic resins, and among the two or more types of the thermoplastic resins, a content of a thermoplastic resin having a melting point lower than a melting point of a thermoplastic resin having a largest content in the intermediate layer is from 3 to 15 mass % in the intermediate layer.

(4) The printing paper according to any one of (1) to (3) above, where a porosity of each of the surface layer and the intermediate layer is from 10 to 50 mass %, and a porosity of the base layer is from 20 to 60 mass %.

(5) The printing paper according to any one of (1) to (4) above, where the base layer, the surface layer, or the intermediate layer contains fillers and being a stretched film stretched in at least one direction.

(6) The printing paper according to (5) above, where a content of the fillers in the surface layer is from 40 to 60 mass %, a content of the fillers in the intermediate layer is from 15 to 63 mass %, and a content of the fillers in the base layer is from 10 to 60 mass %.

(7) The printing paper according to (5) or (6) above, where an average particle size of the fillers in the surface layer is from 0.1 to 0.9 µm, an average particle size of the fillers in the intermediate layer is from 0.5 to 10 µm, and an average particle size of the fillers in the base layer is from 0.5 to 10 µm.

DESCRIPTION OF THE EMBODIMENTS

The printing paper according to embodiments of the present invention will be described in detail below; however, the explanation of the components described below are examples (representative examples) of the present invention, and the present invention is not limited to these.

In the following description, the description of "(meth) acryl" indicates both acryl and methacryl. Furthermore, the numeric ranges expressed using "to" indicate ranges that include the numeric values indicated before and after the "to" as the lower and upper limit values, respectively.

Printing Paper

The printing paper according to an embodiment of the present invention is a laminate of a base layer, an intermediate layer, and a surface layer. The intermediate layer is arranged adjacent to the base layer and on the base layer, and the surface layer is arranged adjacent to the intermediate layer and on the intermediate layer. All of the base layer, the intermediate layer, and the surface layer are porous films, and the average pore size of each of the layers increases successively from the surface layer, the intermediate layer, to the base layer. In an embodiment of the present invention, the average pore size of the surface layer is from 0.2 to 5 µm, the average pore size of the intermediate layer is from 5 to 70 µm, and the average pore size of the base layer is from 70 to 200 µm. The average pore size of the intermediate layer is greater than that of the surface layer, and the average pore size of the base layer is greater than that of the intermediate layer.

For the printing paper in which the average pore sizes of the adjacent three layers gradually increases from the surface side to the interior of the printing paper as described above, gloss ghosting is less likely to occur even when the printing paper is printed on both sides using an oil-based ink and then stacked. The gloss ghosting refers to a phenomenon of the coloring performance deterioration, in which a portion of a printed image is deteriorated in coloring performance. While the mechanism for gloss ghosting suppression has not been made clear, the inventors of the present invention consider it as follows.

Figure 1:
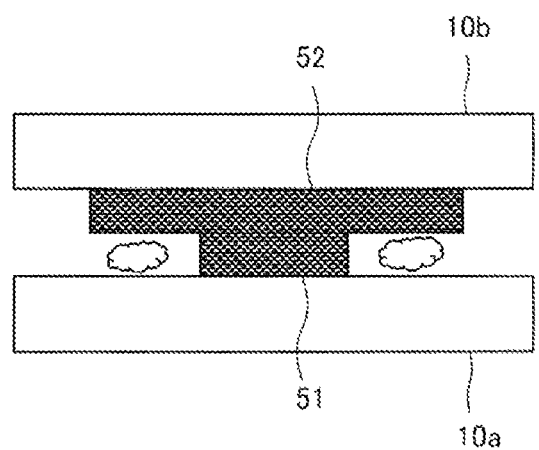
FIG. 1 is a side view illustrating stacked printing paper.

When the inventors of the present invention studied the gloss ghosting, it was found that among printed materials stacked after being printed on both sides, the gloss ghosting tends to occur on the printed layer that was printed later. It is presumed that this is caused by the solvent during drying. As illustrated in FIG. 1, when printed materials 10a and 10b having both sides printed are stacked, a printed layer 51 of the printed material 10a that was printed earlier was not adequately dried yet. Drying of the printed layer 52 of the printed material 10b that was printed later is further delayed compared to the printed layer 51 that was printed earlier.

Figure 2:
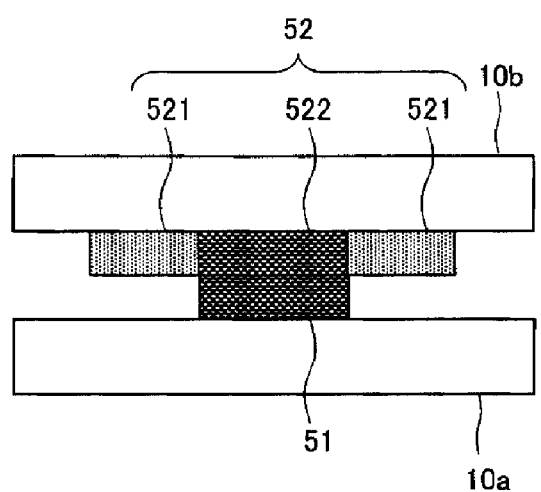
FIG. 2 is a side view illustrating printing paper in which gloss ghosting occurred.

During the stacking, drying of the printed layers 51 and 52 progresses, and the solvent component in the printed layers 51 and 52 keeps volatilizing. In a case where the printed layer 51 that was printed earlier has a smaller area than that of the printed layer 52 that was printed later and a space is present between the stacked printed materials 10a and 10b, the solvent stays in this space. It is conceived that, as illustrated in FIG. 2, the solvent, which has stayed in the space, infiltrates into a portion 521, at which the printed layer 51 that has been printed earlier do not overlap the printed layer 52 that has been printed later. And thus, the coloring performance thereof is deteriorated. Due to the deterioration of the coloring performance, in the printed layer 52 that has been printed later, the difference in the coloring performance occur between the portion 521 and the portion 522, where the printed layer 51, which has been printed earlier, does not overlap the portion 521 but overlaps the portion 522.

In contrast, in the printing paper of an embodiment of the present invention, the surface layer, to which the printed layer is layered, has a small average pore size and a capillary action phenomenon readily occurs. Thus, the solvent in the printed layer can be quickly infiltrated into the interior of the printing paper. Meanwhile, because the coloring material such as a pigment in the printed layer does not readily infiltrate into the interior, a color development concentration can be achieved with a little amount of ink. Since the average pore size successively increases from the intermediate layer to the base layer, the base layer in the interior of the printing paper can retain a large amount of the solvent that has infiltrated through the surface layer and the intermediate layer.

In this way, in the printing paper according to an embodiment of the present invention, three layers are each adjusted separately in its function such that the surface layer side has a large solvent infiltration function and the base layer side has a large solvent retention function. According to the printing paper of an embodiment of the present invention, the solvent in the printed layer is quickly infiltrated into the interior and retained therein, and thus the amount of the solvent volatilized from the printed layer and retained between stacked printed materials can be reduced. Therefore, gloss ghosting can be significantly reduced.

Note that the printing paper according to an embodiment of the present invention may have the intermediate layer and the surface layer on one side of the base layer, or may have each of them on both sides. Furthermore, the printing paper according to an embodiment of the present invention may have another layer as long as the another layer does not impair the effect of the present invention. For example, the printing paper according to an embodiment of the present invention may have an antistatic layer on the surface layer.

Figure 3:
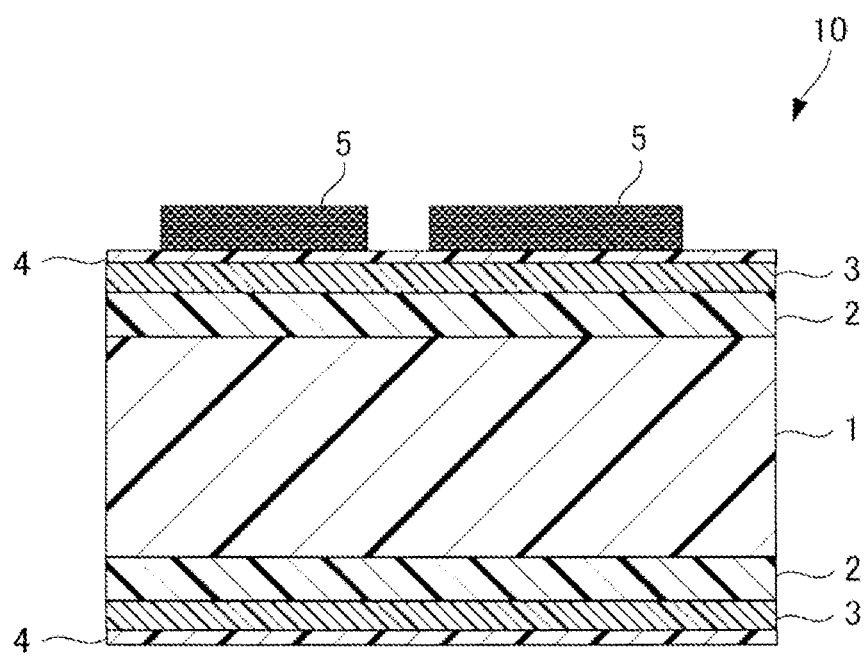
FIG. 3 is a cross-sectional view illustrating a structure of printing paper according to an embodiment of the present invention.

FIG. 3 is a cross-sectional view illustrating a structure of printing paper according to an embodiment of the present invention.

In the example of the printing paper 10 illustrated in FIG. 3, on each of both sides of the base layer 1, each of intermediate layers 2,2 and each of surface layers 3,3 are provided in this order. On each of the surface layers 3,3, each of antistatic layers 4,4 is provided. On the antistatic layer 4, a printed layer 5 can be formed by printing. Note that the layers 2 to 4 on one side of the base layer may have compositions, thicknesses, and the like that are identical to or different from those of the layers 2 to 4 on the other side.

Each layer constituting the printing paper according to an embodiment of the present invention will be described below.

Surface Layer

The surface layer is a thermoplastic resin film having pores. In the surface layer, a solvent in an ink is quickly absorbed and transported to the intermediate layer in the interior. Thus, ink dryability, in addition to reduction in gloss ghosting, can be imparted to the printing paper.

From the perspective of the formability of pores, the surface layer preferably contains a thermoplastic resin and fillers.

Thermoplastic Resin

Examples of the thermoplastic resin include polyolefin-based resins, polyester-based resins, polyamide-based resins, polystyrene-based resins, polyvinyl chloride resins, and polycarbonate resins. One type of these can be used alone, or two or more types of these can be used in combination. From the perspective of improving layer strength, the thermoplastic resin is preferably a polyolefin-based resin or a polyester-based resin, and more preferably a polypropylene-based resin or a polyethylene-based resin.

The thermoplastic resin preferably contains a hydrophobic or nonpolar resin. In a case where the pores in the surface layer communicate each other, inclusion of such a resin can increase the amount of the solvent absorbed. In the present specification, the hydrophobic or nonpolar resin refers to, for example, a resin having a solubility parameter (SP value) of 10 or smaller. The SP value is preferably 9.5 or smaller, more preferably 9.0 or smaller, and even more preferably 8.0 or smaller. Furthermore, the SP value can be 6.5 or greater, and may be 7.0 or greater. The SP value is a value calculated by a method proposed by Small.

Examples of the hydrophobic or nonpolar thermoplastic resin include polyolefin-based resins and polystyrene-based resins. The content of the hydrophobic or nonpolar resin is preferably 80 mass % or greater, more preferably 90 mass % or greater, and even more preferably 95 mass % or greater, based on the total mass of the thermoplastic resin. The content of the hydrophobic or nonpolar resin may be 99 mass % or smaller, 98 mass % or smaller, and 97 mass % or smaller, based on the total mass of the thermoplastic resin. The entire thermoplastic resin may be constituted of the hydrophobic or nonpolar resin.

From the perspective of preventing fillers from falling off, the thermoplastic resin may further contain an acid-modified resin. Examples of the acid-modified resin include maleic acid-modified polyolefins. The content of the acid-modified resin is preferably 10 mass % or smaller, more preferably 5 mass % or smaller, and even more preferably 3 mass % or smaller, based on the total mass of the thermoplastic resin. The content of the acid-modified resin may be 0.1 mass % or greater, 0.5 mass % or greater, and 1 mass % or greater, based on the total mass of the thermoplastic resin.

Fillers

Examples of the fillers include inorganic fillers and organic fillers, and either one can be used alone or a combination of both can be used. In a case where a thermoplastic resin film containing fillers is stretched, a large number of fine pores having fillers as cores can be easily formed.

Examples of the inorganic fillers include heavy calcium carbonate, light calcium carbonate, baked clay, talc, diatomaceous earth, barium sulfate, magnesium oxide, zinc oxide, titanium dioxide, and silicon dioxide.

Examples of the organic fillers include polyethylene terephthalate, polybutylene terephthalate, polyethylene naphthalate, polystyrene, polyamide, polycarbonate, polyethylene sulfide, polyphenylene sulfide, polyimide, polyether ketone, polyether ether ketone, polymethyl methacrylate, poly-4-methyl-1-pentene, homopolymers of cyclic olefin, and copolymers of cyclic olefin and ethylene.

The inorganic fillers or the organic fillers may be surface-treated or coated by a fatty acid having from 12 to 20 carbons and the like, from the perspective of dispersion of fillers each having a relatively small particle size in the resin and from the perspective of improvement of wettability toward solvent to enhance transport performance of the solvent to the intermediate layer and dryability of the solvent.

One type of the inorganic fillers or the organic fillers can be used alone, or two or more types of the inorganic fillers or the organic fillers can be used in combination. Among these, from the perspective of ease in adjustment of the particle size distribution, the inorganic fillers are preferred. Among the inorganic fillers, from the perspectives of pore formation and cost, heavy calcium carbonate or light calcium carbonate is preferred, and from the perspective of weather resistance, titanium dioxide is preferred.

The average particle size of the fillers is, in terms of median diameter (D50), preferably 0.1 μm or greater, more preferably 0.15 μm or greater, and even more preferably 0.2 μm or greater. The average particle size is preferably 0.9 μm or smaller, more preferably 0.6 μm or smaller, and even more preferably 0.45 μm or smaller. When the average particle size is in the range described above, adjustment of the average pore size to the specific range can be facilitated, and porosity can be also adjusted.

The average particle size (D50) of the filler and the maximum particle size (D100) described below can be measured by a laser diffraction particle size analyzer. Furthermore, the average particle size of the fillers can be also determined as an average dispersion particle size of the fillers when the fillers are dispersed in a thermoplastic resin by melt kneading and dispersing. Specifically, the cross section of the film is observed using an electron microscope, and the largest dimension of a filler particle is measured for at least 10 filler particles. The average value thereof is used as the average dispersion particle size.

The content of the fillers in the surface layer is preferably 40 mass % or greater, more preferably 45 mass % or greater, and even more preferably 50 mass % or greater, from the perspective of pore formability. From the perspective of adequately maintaining the strength of the surface layer, the content is preferably 60 mass % or smaller, more preferably 58 mass % or smaller, and even more preferably 55 mass % or smaller. When the content is in the range described above, adjustment of the average pore size to the specific range can be facilitated, and porosity can be also adjusted.

From the perspective of pore formability, the surface layer is preferably a stretched film, the stretched film containing fillers and being stretched in at least one direction.

Intermediate Layer

The intermediate layer is a thermoplastic resin film having pores, and the average pore size thereof is greater than that of the surface layer and smaller than that of the base layer. Such an intermediate layer readily exhibits a capillary action phenomenon, and the solvent transported from the surface layer is easily transported to the base layer. Furthermore, because the intermediate layer can retain solvent to a certain degree, the intermediate layer can retain the solvent that cannot be retained by the base layer. Furthermore, when the intermediate layer has pores, undulation corresponding to the pores of the intermediate layer is formed on the surface of the printed layer. The adequate average pore size of the intermediate layer can form a surface with surface roughness that is effective for solvent discharge onto the surface of the printed layer.

From the perspective of the formability of pores, the intermediate layer preferably contains a thermoplastic resin and fillers.

As the thermoplastic resin of the intermediate layer, the same kind of a thermoplastic resin that is used for the thermoplastic resin of the surface layer can be used. One type of the thermoplastic resins described above can be used alone, or two or more types of the thermoplastic resins can be used in combination.

In a case where two or more types are used in combination, from the perspective of suppressing excessive increase in the average pore size, it is preferable to use a first thermoplastic resin, a content of which is the greatest among the two or more types of thermoplastic resins in the intermediate layer, together with a second thermoplastic resin, which has a lower melting point than that of the first thermoplastic resin. The second thermoplastic resin, which melts more readily than the first thermoplastic resin, suppresses formation of pores in the first thermoplastic resin at a stretching temperature, facilitating adjustment of the average pore size to an adequate range. In addition, this also enables adjustment of porosity. The content of the second thermoplastic resin in the intermediate layer is preferably 3 mass % or greater, more preferably 5 mass % or greater, and preferably 15 mass % or smaller, and more preferably 10 mass % or smaller, based on the total mass of the thermoplastic resins. When the content is in the range described above, the pore size of the intermediate layer is easily adjusted.

As the fillers of the intermediate layer, the same kind of fillers that is used for the fillers in the surface layer can be used. One type of the inorganic fillers or the organic fillers described above can be used alone, or two or more types of the inorganic fillers or the organic fillers can be used in combination.

The average particle size of the fillers in the intermediate layer is, in terms of median diameter (D50), preferably 0.5 μm or greater, more preferably 1.0 μm or greater, and even more preferably 2.0 μm or greater. The average particle size is preferably 10 μm or smaller, more preferably 8 μm or smaller, and even more preferably 5 µm or smaller. When the average particle size is in the range described above, adjustment of the average pore size to the specific range can be facilitated, and porosity can be also adjusted.

The intermediate layer preferably contains fillers having a maximum particle size (D100) of 5 µm or greater. The coarse fillers of 5 µm or greater in the intermediate layer facilitates the formation of recesses and protrusions on a surface of the surface layer. Such recesses and protrusions form a flow pass between the stacked printing paper, promoting discharging of the solvent that is volatilized from the printed layer through this flow pass. Thus, occurrence of gloss ghosting is easily reduced.

The content of the fillers in the intermediate layer is preferably 15 mass % or greater, more preferably 20 mass % or greater, and even more preferably 30 mass % or greater, from the perspective of formability of pores. From the perspective of adequately maintaining the strength of the intermediate layer, the content is preferably 63 mass % or smaller, more preferably 60 mass % or smaller, and even more preferably 50 mass % or smaller. When the content is in the range described above, adjustment of the average pore size to the specific range can be facilitated, and porosity can be also adjusted.

From the perspective of pore formability, the intermediate layer is more preferably a stretched film, the stretched film containing fillers and being stretched in at least one direction.

Base Layer

The base layer is a thermoplastic resin film having pores. The base layer functions as a support of the printing paper, and can impart strength, stiffness and the like to the printing paper. The pores may enhance whiteness or opacity of the printing paper. Furthermore, the average pore size of the base layer is greater than that of the intermediate layer. Thus, the base layer can retain a large amount of the solvent transported from the surface layer through the intermediate layer.

From the perspective of the formability of pores, the base layer preferably contains a thermoplastic resin and fillers.

As the thermoplastic resin of the base layer, the same kind of a thermoplastic resin that is used for the surface layer can be used. One type of the thermoplastic resins described above can be used alone, or two or more types of the thermoplastic resins can be used in combination. From the perspective of imparting strength to the printing paper, the thermoplastic resin of the base layer is preferably a polyolefin-based resin or a polyester-based resin, and more preferably a polypropylene-based resin or a polyethylene-based resin.

As the fillers of the base layer, the same kind of the fillers that is used for the surface layer can be used. One type of the inorganic fillers or the organic fillers described above can be used alone, or two or more types of the inorganic fillers and/or the organic fillers can be used in combination.

The average particle size of the fillers in the base layer is preferably 0.5 µm or greater, more preferably 1 µm or greater, and even more preferably 3 µm or greater, from the perspective of formability of pores. Furthermore, in a case where pores are formed in the interior by stretching to enhance opacity or printability, from the perspective of suppressing breaking of sheet during stretching or suppressing strength reduction of the base layer, the average particle size of the fillers is preferably 10 µm or smaller, more preferably 8 µm or smaller, and even more preferably 6 µm or smaller. When the average particle size is in the range described above, adjustment to the specific average pore size can be facilitated, and porosity can be also adjusted.

The content of the fillers in the base layer is preferably 10 mass % or greater, more preferably 15 mass % or greater, and particularly preferably 30 mass % or greater. On the other hand, the content of the fillers in the base layer is preferably 60 mass % or smaller, more preferably 50 mass % or smaller, and particularly preferably 45 mass % or smaller. When the content is in the range described above, adjustment of the average pore size to the specific range can be facilitated, and porosity can be also adjusted.

From the perspective of pore formability, the base layer preferably contains fillers and is preferably stretched in at least one direction. From the perspective of enhancing film strength, the base layer is preferably a stretched film that has been stretched in two directions. In a case where the base layer is a stretched film that has been stretched in a machine direction (MD), the base layer can have a greater average pore size and tends to have a greater porosity.

Other Additive

As necessary, the surface layer, the intermediate layer, and the base layer may contain additives, such as heat stabilizers (antioxidants), light stabilizers, dispersants, and lubricants. When a heat stabilizer is used, each of the layers contains typically from 0.001 to 1 mass % of the heat stabilizer. Examples of the heat stabilizer include sterically hindered phenol-based, phosphorus-based, and amine-based stabilizers. When a light stabilizer is used, each of the layers contains typically from 0.001 to 1 mass % of the light stabilizer. Examples of the light stabilizer include sterically hindered amine-based, benzotriazole-based, and benzophenone-based light stabilizers. The dispersant or lubricant can be used for the purpose of dispersing, for example, inorganic fillers. The used amount of the dispersant or lubricant is typically range from 0.01 to 4 mass %. Examples of the dispersant or lubricant include silane coupling agents, higher fatty acids such as oleic acid and stearic acid, metallic soaps, polyacrylic acid, polymethacrylic acid, and salts thereof.

Antistatic Layer

The antistatic layer can suppress deposition of foreign materials to the printing paper caused by static electricity and reduction in transportability caused by blocking. The antistatic layer can be formed by, for example, coating a coating solution containing an antistatic agent on the surface layer. The antistatic layer is a thin coating layer that covers the surface of the surface layer having pores. The antistatic layer does not block the pores of the surface layer.

Antistatic Agent

The antistatic agent is not particularly limited, and a known antistatic agent such as polymer-based and metal oxide-based antistatic agents can be used. As the polymer-based antistatic agent, cationic, anionic, amphoteric, and nonionic antistatic agents are known, and any of these can be used. Examples of the cationic antistatic agent include compounds each having an ammonium salt structure or a phosphonium salt structure. Examples of the anionic antistatic agent include alkali metal salts of sulfonic acid, phosphoric acid, and carboxylic acid, and specifically includes compounds each having a structure of alkali metal salt of acrylic acid, methacrylic acid, maleic acid (maleic anhydride), or the like (e.g., lithium salt, sodium salt, or potassium salt) in the molecular structure. Examples of the amphoteric antistatic agent include compounds having both the cationic and anionic structures described above in one molecule, and specifically include betaine-based antistatic agents. Examples of the nonionic antistatic agent include ethylene oxide polymers having an alkylene oxide structure and polymers having an ethylene oxide polymer component in the molecular chain. Examples of the metal oxide-based antistatic agent include metal oxide-containing microparticles, such as a colloidal silica sol containing a metal oxide layer on the surface of the colloidal silica. In addition, examples thereof include polymer-based antistatic agents having boron in the molecular structure. One type of these can be used alone, or two or more types of these can be used in combination.

Among these, from the perspective of excellent antistatic performance, a cationic polymer-based antistatic agent is preferred, and a nitrogen-containing polymer-based antistatic agent, such as a tertiary nitrogen or quaternary nitrogen (ammonium salt structure)-containing acrylic polymer is more preferred.

A commercially available product can be also used as the antistatic agent. Examples of the commercially available tertiary or quaternary nitrogen-containing acrylic polymer include SAFTOMER ST-1000, SAFTOMER ST-1100, SAFTOMER ST-1300, and SAFTOMER ST-3200 (all available from Mitsubishi Chemical Corporation) which are water soluble and facilitate easy preparation of a coating solution.

Anchoring Agent

The antistatic layer may contain an anchoring agent from the perspective of achieving more stable adherence to the ink. The anchoring agent is not particularly limited, and a known anchoring agent can be appropriately used. Examples of the anchoring agent that can be used include ethyleneimine adducts of polyimine-based polymer or polyamine polyamide and a mixture of these. Examples of the ethyleneimine adducts of polyimine-based polymer or polyamine polyamide include: ethyleneimine adducts of polyethyleneimine, poly(ethyleneimine-urea) and polyamine polyamide; alkyl-modified products, cycloalkyl-modified products, aryl-modified products, allyl-modified products, aralkyl-modified products, benzyl-modified products, cyclopentyl-modified products, and aliphatic cyclic hydrocarbon-modified products thereof; hydroxides thereof; and composites thereof. One type of these can be used alone, or two or more types of these can be used in combination.

When the antistatic agent and the anchoring agent are used in combination, the content ratio of these can be appropriately set based on the required performance and is not particularly limited. From the perspective of adequately exhibiting performance of each component, the content of the anchoring agent is, in terms of solid proportion, from 0 to 200 parts by mass, more preferably from 0 to 150 parts by mass, even more preferably from 0 to 100 parts by mass, and particularly preferably from 0 to 50 parts by mass, relative to 100 parts by mass of the antistatic agent.

Production Method of Printing Paper

The production method of the printing paper according to an embodiment of the present invention is not particularly limited, and production can be performed by, for example, film-forming each of the base layer, the intermediate layer, and the surface layer and laminating these. The lamination may be performed after each of the layers is film-formed separately, or the film formation of the layers and the lamination may be performed in parallel.

As the film forming method, for example, cast forming in which a molten resin is extruded into a sheet shape by a monolayer or multilayer T-die, I-die, or the like connected to a screw extruder, calender forming, roller forming, or inflation forming can be used. The film formation may be performed by subjecting a mixture of a thermoplastic resin and an organic solvent or an oil to cast forming or calender forming and then removing the solvent or the oil. The materials of each of the layers is selected and blended in a manner that each of the layers has the composition described above.

Examples of the lamination method of each of the layers include: coextrusion methods that use a multilayer die using a feed block, multi-manifold feed block, or multi-manifold; and extrusion lamination methods that use a plurality of dies. These methods can be also combined.

In a case where the printing paper contains a plurality of layers that are stretched, each layer may be separately stretched before laminating each layer, or stretching may be performed at once after the lamination. Furthermore, stretching may be performed again after the stretched layers are laminated.

Examples of the stretching method include: a machine-direction stretching method utilizing the circumferential speed difference of a group of rollers; a transverse-direction stretching method using a tenter oven; a sequential biaxial stretching method which combines these; a rolling method; a simultaneous biaxial stretching method utilizing a combination of a tenter oven and a pantograph; and a simultaneous biaxial stretching method utilizing a combination of a tenter oven and a linear motor. Furthermore, a simultaneous biaxial stretching (inflation forming) method in which a molten resin is extruded and formed into a tube shape using a circular die connected to a screw extruder and then air is inflated thereto can be used.

The stretching temperature during stretching can be set, taking composition of each of the layers, such as the melting point of the thermoplastic resin, and the like into consideration. For example, the stretching temperature can be set to a temperature that is at (the melting point of the thermoplastic resin used)±40° C. Among these, the stretching temperature is preferably not higher than the melting point of the thermoplastic resin, and more preferably in a temperature range that is at 2 to 20° C. lower than the melting point. When the thermoplastic resin used is an amorphous resin, the stretching temperature is preferably in a range that is not lower than the glass transition temperature of the thermoplastic resin. Furthermore, when the thermoplastic resin is a crystalline resin, the stretching temperature is preferably not lower than the glass transition point of the amorphous part of the thermoplastic resin and not higher than the melting point of the crystalline part of the thermoplastic resin, and specifically preferably a temperature that is 2 to 60° C. lower than the melting point of the thermoplastic resin.

The stretching rate is not particularly limited; however, from the perspective of stable stretch forming, the stretching rate is preferably in a range from 20 to 350 m/min.

Furthermore, the stretching ratio can be also appropriately selected, taking the characteristics of the thermoplastic resin used and the like into consideration. For example, when a thermoplastic resin film containing a homopolymer of propylene or copolymer thereof is uniaxially stretched, the lower limit of the stretching ratio thereof is typically 1.2-fold or greater, preferably 2-fold or greater, and more preferably 5-fold or greater, and the upper limit is typically 12-fold or smaller, and preferably 10-fold or smaller. On the other hand, when biaxial stretching is performed, the lower limit of the stretching ratio, in terms of area stretching ratio, is typically 1.5-fold or greater, and preferably 10-fold or greater, and the upper limit is typically 60-fold or smaller, and preferably 50-fold or smaller.

Furthermore, when the thermoplastic resin film containing a polyester-based resin is stretched in one direction, the lower limit of the stretching ratio thereof is typically 1.2-fold or greater, and preferably 2-fold or greater, and the upper limit is typically 10-fold or smaller, and preferably 5-fold or smaller. When biaxial stretching is performed, the lower limit of the stretching ratio, in terms of area stretching ratio, is typically 1.5-fold or greater, and preferably 4-fold or greater, and the upper limit is typically 20-fold or smaller, and preferably 12-fold or smaller.

As long as the stretching ratio is in the range described above, the target porosity can be achieved and opacity tends to be enhanced. Furthermore, breakage of the thermoplastic resin film is less likely to occur, and stretch forming is stably performed.

In a case where the stretching ratio of the thermoplastic resin film is high, a high average pore size and porosity tend to be achieved. Therefore, from the perspective of making the average pore size greater than those of the intermediate layer and the surface layer, the stretching ratio of the base layer (the area stretching ratio in a case of biaxial stretching) is preferably not less than the stretching ratios of the surface layer and the intermediate layer.

Surface Treatment

From the perspective of enhancing adhesion to the antistatic layer, the surface layer is preferably subjected to surface treatment.

Examples of surface treatment include corona discharge treatment, frame treatment, plasma treatment, glow discharge treatment, and ozone treatment, and these can be combined. Among these, corona discharge treatment or frame treatment is preferred, and corona discharge treatment is more preferred.

When the corona discharge treatment is performed, the discharge dose is preferably 600 J/m$^2$ (10 W·min/m$^2$) or greater, and more preferably 1200 J/m$^2$ (20 W·min/m$^2$) or greater. Furthermore, the discharge dose is preferably 12000 J/m$^2$ (200 W·min/m$^2$) or smaller, and more preferably 10800 J/m$^2$ (180 W·min/m$^2$) or smaller. When the frame treatment is performed, the discharge dose is preferably 8000 J/m$^2$ or greater, more preferably 20000 J/m$^2$ or greater, and the discharge amount is preferably 200000 J/m$^2$ or smaller, and more preferably 100000 J/m$^2$ or smaller.

The antistatic layer can be formed as follows: a coating solution for antistatic layer formation described above is prepared by mixing an antistatic agent, an anchoring agent, a solvent, and the like; and the coating solution is coated on the surface layer by using coating equipment.

The coating solution used for formation of the antistatic layer can be prepared by dissolving or dispersing various components, such as an antistatic agent, in a solvent. Typical examples of the solvent include water, methyl alcohol, ethyl alcohol, isopropyl alcohol, acetone, methyl ethyl ketone, ethyl acetate, toluene, and xylene. From the perspective of ease of handling during coating, the coating solution is preferably an aqueous solution. The solid concentration of the coating solution is preferably approximately from 0.1 to 20 mass %, more preferably from 0.3 to 15 mass %, and even more preferably from 0.5 to 10 mass %.

As the coating equipment, various known coating equipment can be used, and the coating equipment is not particularly limited. For example, coating equipment such as a die coater, bar coater, lip coater, roll coater, gravure coater, spray coater, blade coater, air-knife coater, or size press coater can be used.

Characteristics of Printing Paper

Average Pore Size

The average pore size of the surface layer is 0.2 μm or greater, preferably 0.3 μm or greater, and more preferably 0.4 μm or greater. The average pore size is 5 μm or smaller, preferably 3 μm or smaller, and more preferably 2 μm or smaller. When the average pore size is not less than the lower limit value, function of the pores, such acting as a path to transport an adequate amount of solvent in the ink to the intermediate layer and the base layer, is readily achieved. Therefore, dryability is readily achieved. In addition, when printed materials are stacked, the amount of the solvent staying on the printed material surfaces can be reduced, and thus gloss ghosting is readily reduced. Furthermore, when the average pore size is not greater than the upper limit value, a capillary action phenomenon is readily exhibited for the solvent component of the ink. In addition to better dryability and gloss ghosting reducing effect, the coloring material in the ink tends to stay on the surface, and thus behavior of color development concentration tends to be improved.

The average pore size of the intermediate layer is 5 μm or greater, preferably 10 μm or greater, more preferably 15 μm or greater, and even more preferably 20 μm or greater. The average pore size is 70 μm or smaller, preferably 65 μm or smaller, more preferably 60 μm or smaller, and even more preferably 50 μm or smaller. When the average pore size is not less than the lower limit value, the amount of the solvent retained in the intermediate layer is likely to increase, and function of the pores as a transporting path of the solvent to the base layer is readily achieved. Therefore, dryability is readily achieved. In addition, when printed materials are stacked, the amount of the solvent staying on the printed material surfaces can be reduced, and thus gloss ghosting is readily reduced. Furthermore, when the average pore size is not higher than the upper limit value, a capillary action phenomenon is readily exhibited, and the solvent transportability to the base layer is likely to be enhanced. Furthermore, the pores having the average pore size of not higher than the upper limit value and not less than the lower limit value is likely to make undulation on the printing paper surface neither excessively wide nor excessively narrow, thereby contributing to formation of a surface roughness that is effective for solvent discharge.

The average pore size in the base layer is 70 μm or greater, preferably 75 μm or greater, and more preferably 80 μm or greater. The average pore size is 200 μm or smaller, preferably 190 μm or smaller, and more preferably 180 m or smaller. When the average pore size is not less than the lower limit value, the base layer of the printing paper interior can retain a large amount of the solvent which is transported through the surface layer and the intermediate layer. Therefore, in a case where printing is performed using a large amount of ink, it is less likely that the base layer fails to retain the solvent, causing solvent overflow. And thus, the solvent is prevented from staying on the printing paper surface, thereby suppressing gloss ghosting. Furthermore, when the average pore size is not greater than the upper limit value, breakage of sheet is easily suppressed.

In a case where each of the surface layer, the intermediate layer, and the base layer has pores whose average pore size is in the range described above and increases sequentially from the surface layer, the intermediate layer to the base layer, both dryability and solvent absorption capacity due to the capillary action phenomenon are achieved, surface roughness that can discharge solvent to the outside can be achieved, and suppression of gloss ghosting is effectively achieved.

The average pore size of each of the layers is an average dimension of the pores in the machine direction (MD) of the film, when the pores present in a certain region in a cross section of the printing paper are observed by an electron microscope.

The average pore size of each of the layers can be adjusted by, for example, the average particle size, the content of the fillers, and the relationship between the resin type and stretching conditions.

Porosity

From the perspective of increasing communicating holes, the porosity of the surface layer is preferably 10% or greater, more preferably 20% or greater, and even more preferably 25% or greater. From the perspective of reducing events of printing failure, such as picking, by increasing the surface strength, the porosity is preferably 50% or smaller, more preferably 45% or smaller, and even more preferably 40% or smaller.

From the perspective of increasing communicating holes, the porosity of the intermediate layer is preferably 10% or greater, more preferably 15% or greater, even more preferably 20% or greater, and particularly preferably 25% or greater. From the perspective of not making the average pore size excessively large, the porosity is preferably 50% or smaller, more preferably 45% or smaller, and even more preferably 40% or smaller.

From the perspective of enhancing solvent retention, the porosity of the base layer is preferably 20% or greater, more preferably 25% or greater, and even more preferably 30% or greater. From the perspective of suppressing sheet breakage, the porosity is preferably 60% or smaller, more preferably 50% or smaller, and even more preferably 40% or smaller.

The porosity can be determined by a proportion of an area occupied by pores in a certain region of a cross section of the printing paper observed by an electron microscope.

The porosity of each of the layers can be adjusted by parameters such as the average particle size, the content of the fillers, and the relationship between the resin type and stretching conditions.

Thickness

The thickness (total thickness) of the printing paper may be appropriately set according to the use or the required performance. The total thickness of the printing paper refers to a sum of the thicknesses of the layers constituting the printing paper. The total thickness of the printing paper is preferably 30 µm or greater, more preferably 60 µm or greater, and even more preferably 100 µm or greater, and preferably 550 µm or smaller, more preferably 400 µm or smaller, and even more preferably 300 µm or smaller. When the printing paper has the total thickness in the range described above, failures are less likely to occur during offset printing, and use value as the printing paper tends to be high.

The thickness of each of the layers constituting the printing paper is designed such that the total thickness is in the range described above.

Furthermore, when the intermediate layers, the surface layers, and the antistatic layers are provided on both sides of the base layer, the thickness of each of the layers that are provided on both sides may be identical or different.

The thickness of the surface layer is preferably 2 µm or greater, more preferably 3 µm or greater, and even more preferably 5 µm or greater, and preferably 12 µm or smaller, more preferably 10 µm or smaller, and even more preferably 8 µm or smaller. When the thickness of the surface layer is in the range described above, transport of the solvent to the intermediate layer and the base layer is facilitated, and dryability is easily achieved. Furthermore, recesses and protrusions are readily formed on the surface due to the fillers in the intermediate layer and the pores having an appropriate size. Because such recesses and protrusions forms a flow pass for the solvent in between the stacked printing paper, gloss ghosting tends to be suppressed by discharging the solvent externally.

The thickness of the intermediate layer is preferably 0.5 µm or greater, more preferably 1 µm or greater, and even more preferably 2 µm or greater, and preferably 120 µm or smaller, more preferably 85 µm or smaller, and even more preferably 70 µm or smaller. When the thickness of the intermediate layer is in the range described above, transport of the solvent to the base layer is facilitated, and appropriate recesses and protrusions tend to be formed on the surface layer.

The thickness of the base layer is only required to be adjusted such that the total thickness is in the range described above. Specifically, the thickness of the base layer is preferably 9 µm or greater, more preferably 20 µm or greater, and even more preferably 50 µm or greater, and preferably 500 µm or smaller, more preferably 350 µm or smaller, and even more preferably 250 µm or smaller. When the thickness of the base layer is in the range described above, absorption capacity for the solvent in the ink can be increased while cost is suppressed.

The thickness of the antistatic layer can be controlled by the coated amount of the coating solution for antistatic layer formation. From the perspectives of suppressing production cost or stickiness, or achieving stabilizing effect of ink adhesion over time, the coated amount is, in terms of solid content, preferably 0.01 $g/m^2$ or greater, and more preferably 0.02 $g/m^2$ or greater, and preferably 3 $g/m^2$ or smaller, more preferably 1 $g/m^2$ or smaller, and even more preferably 0.5 $g/m^2$ or smaller.

Surface Specific Electrical Resistance

The surface specific electrical resistance of the printing paper is preferably 14 (log $\Omega$) or smaller. When the surface specific resistance is in the range described above, transportability of the printing paper for sheet-fed printing can be enhanced, and troubles caused by static electricity in post processing, such as folding and bookbinding, can be reduced.

Use of Printing Paper

According to the printing paper of an embodiment of the present invention, a printed material having high gloss and excellent weatherability can be obtained by printing. Therefore, for example, the printing paper is advantageously employed for commercial printed materials such as posters, pamphlets, catalogues, signboards, or menu, publications such as books, maps, book jackets, or book marks, and wrapping paper. Among these applications, due to its high basic performance, the printing paper according to an embodiment of the present invention is advantageously employed for applications including: outdoor use where the printed material is affected by sunlight and rainwater, such as posters for election or posters for signboards; the use in an environment where the printed material is exposed to water, for example, in sauna, public bath, or bathroom, such as posters; and use in an environment under which the printed material may come into contact with water, such as menu in restaurants.

Printed Material

The printing paper according to an embodiment of the present invention can be applicable to various printing methods without limitation as to printing methods, such as offset printing, relief printing, flexographic printing, and screen printing. However, the printing paper is particularly suitable for offset printing. Furthermore, for the printing paper according to an embodiment of the present invention, various oil-based inks can be used, such as inks for offset printing, inks for relief printing, inks for flexographic printing, and inks for screen printing. However, inks for offset printing is particularly preferably used. Note that the viscosity of the ink varies depending on, for example, the type of the ink and the printing method and is not particularly limited.

An oil-based ink, which contains a relatively large amount of solvent, has been generally used for pulp paper and its application to synthetic paper has been difficult. The printing paper according to an embodiment of the present invention has excellent ink dryability for the oil-based ink, and suppresses occurrence of gloss ghosting. Therefore, even in a case where the printing paper according to an embodiment of the present invention is used in place of pulp paper, there is no need for changing the ink. Furthermore, for example, even for inks for synthetic paper, which has smaller amounts of evaporation-drying components and permeation-drying components, and even for ultraviolet curable inks, the printing paper according to an embodiment of the present invention has excellent ink dryability and suppresses occurrence of gloss ghosting. That is, the printing paper according to an embodiment of the present invention can be employed for any ink among inks for various printing methods described above and is very versatile. Therefore, according to embodiments of the present invention, a printed material having the printing paper described above and a printed layer provided on the printing paper can be provided. The printed layer can be formed by printing by using an ink such as the oil-based ink described above.

EXAMPLES

Embodiments of the present invention will be further described specifically below using examples; however, the present invention is not limited to the examples below. Note that descriptions using "part", "%", and the like in the examples are based on mass unless otherwise noted.

Table 1 lists raw materials used for Examples and Comparative Examples

TABLE 1

|  | Abbreviation | Content |
|---|---|---|
| Antistatic agent | ST | Cationic acrylic polymer<br>Trade name: SAFTOMER ST 3200, available from Mitsubishi Chemical Corporation |
| Thermoplastic resin | MA | Polypropylene resin<br>Trade name: Novatec PP MA3, available from Japan Polypropylene Corporation<br>MFR (230° C., load of 2.16 kg): 11 g/10 min<br>Melting point (DSC method): 162° C. |
|  | FW | Polypropylene resin<br>Trade name: Novatec PP FW4B, available from Japan Polypropylene Corporation<br>MFR (230° C., load of 2.16 kg): 7 g/10 min<br>Melting point (DSC method): 132° C. |
| Fillers | C5 | Heavy calcium carbonate<br>Trade name: CALTEX 5, available from Maruo Calcium Co., Ltd.<br>Average particle size (D50): 1.0 μm<br>Maximum particle size (D100): 4.0 μm |
|  | C7 | Heavy calcium carbonate<br>Trade name: CALTEX 7, available from Maruo Calcium Co., Ltd.<br>Average particle size (D50): 1.0 μm<br>Maximum particle size (D100): 6.0 μm |
|  | YM23 | Light calcium carbonate surface-treated with fatty acid<br>Trade name: YM 23, available from Maruo Calcium Co., Ltd.<br>Average particle size (D50): 0.23 μm<br>Maximum particle size (D100): 3.0 μm |
|  | YM50 | Light calcium carbonate surface-treated with fatty acid<br>Trade name: YM 50, available from Maruo Calcium Co., Ltd.<br>Average particle size (D50): 0.5 μm<br>Maximum particle size (D100): 5.0 μm |
|  | 1800 | Heavy calcium carbonate<br>Trade name: SOFTON 1800, available from Bihoku Funka Kogyo Co., Ltd.<br>Average particle size (D50): 2.0 μm<br>Maximum particle size (D100): 11.0 μm |

Example 1

(I) 85 mass % of polypropylene resin (MA) (trade name: Novatec PP MA3, available from Japan Polypropylene Corporation; melting point (DSC method): 162° C.) and 15 mass % of heavy calcium carbonate particles (C5) (trade name: CALTEX 5, available from Maruo Calcium Co., Ltd.; average particle size D50: 1.0 μm; maximum particle size D100: 4.0 μm) were mixed and melt-kneaded by an extruder set at 270° C., and a resin composition (C) was prepared. This was extruded in a sheet form and cooled by a cooling roll, and an unstretched sheet was obtained. After this unstretched sheet was heated again to 150° C., stretching to a ratio of 4.8-fold was performed in a sheet transport direction utilizing the speed difference of rolls, and a machine-direction stretched resin film was obtained.

(II) 55 mass % of polypropylene resin (MA) and 45 mass % of heavy calcium carbonate particles (C5) were mixed and melt-kneaded by an extruder set at 270° C., and a resin composition (B) was prepared.

(III) Meanwhile, 47 mass % of polypropylene resin (MA3) and 53 mass % of light calcium carbonate particles surface-treated with a fatty acid (YM23) (trade name: YM 23, available from Maruo Calcium Co., Ltd.; average particle size D50: 0.23 μm) were mixed by a high-speed mixer. Thereafter, using a twin-screw kneading extruder in which the cylinder temperature was set to 210° C., melt kneading was performed at a rotation speed of 600 rpm while degassing was performed through vent holes, and a resin composition (A) was prepared.

(IV) The prepared resin compositions (A) and (B) were fed to one multilayer die and laminated in the die. This laminate was coextruded in a sheet form from the die, and laminated on one side of the machine-direction stretched resin film obtained in process (I) above so that the layer of the resin composition (A) is positioned outside, and thus a laminate sheet having a three layer structure was obtained.

(V) Using two extruders that are different from (IV) above, the resin composition (B) and the resin composition (A) were separately melt-kneaded by the procedure identical to (IV) above, then were fed to a multilayer die that is different from (IV) above, and laminated in the die. This laminate was coextruded in a sheet form from the die, and laminated on one side of the three-layer structure laminate sheet formed in the process (IV) above, the one side being the side of the machine-direction stretched resin film of the laminate sheet (side of the layer of the resin composition (C)) so that the layer of the resin composition (A) is positioned outside. Thus, a laminate sheet having a five layer structure was produced, in which resin composition (A)/resin composition (B)/resin composition (C)/resin composition (B)/resin composition (A) were laminated in this order.

(VI) The produced laminate sheet having a five layer structure was cooled to 60° C., then heated again to 150° C., stretched to the ratio of 9-fold in a sheet width direction using a tenter, and then subjected annealing treatment at 165° C. Thereafter, after the laminate sheet was cooled again to 60° C., the edge portions were slit, and a thermoplastic resin film having a five layer structure (number of stretching axis of each layer: uniaxial stretching/uniaxial stretching/biaxial stretching/uniaxial stretching/uniaxial stretching; stretching ratio of each layer: 9-fold/9-fold/40.5-fold/9-fold/9-fold; total thickness: 136 m; thickness of each layer ((A)/(B)/(C)/(B)/(A)): 7 m/20 m/82 m/20 m/7 m) was obtained. Note that the layer of the resin composition (A) was the surface layer, the layer of the resin composition (B) was the intermediate layer, and the layer of the resin composition (C) was the base layer.

(VII) A high-frequency power source (device name: AGF-B10, available from Kasuga Electric Works Ltd.), an aluminum electrode having a length of 0.8 μm, and a silicone-covered roll as a treater roll were employed for corona discharge treatment and a gap between the electrode and the roll was set to 5 mm. The thermoplastic resin film produced in (VI) above was passed through at the line treatment speed of 25 m/min. Both surfaces of the film were subjected to corona discharge treatment at an applied energy dose of 1800 J/m$^2$ (30 W·min/m$^2$).

(VIII) An antistatic agent (trade name: SAFTOMER ST-3200 (hereinafter, also referred to as ST), available from Mitsubishi Chemical Corporation; quaternary ammonium salt) was diluted with pure water so that the solid content of the antistatic agent was 1.0 mass %, and a coating solution was prepared. On the both surfaces of the thermoplastic resin film after the corona discharge treatment, the prepared coating solution was coated by a roller coater such that the solid content of the coating layer after drying became 0.02 g/m$^2$ per side. The coating layer was dried and solidified, and printing paper of Example 1 was obtained.

Example 2 and Comparative Example 1

Each of printing papers of Example 2 and Comparative Example 1 was produced in the same manner as in Example 1 except that a polypropylene resin (FW) (trade name: Novatec PP FW4B, available from Japan Polypropylene Corporation; melting point (DSC method): 132° C.) was further added to the resin composition (A) of Example 1 and the contents of the polypropylene resins (MA) and (FW) was adjusted to those listed in Table 2 and Table 3.

Example 3 and Comparative Example 2

Each of printing papers of Example 3 and Comparative Example 2 was produced in the same manner as in Example 1 except that light calcium carbonate particles surface-treated with a fatty acid (YM50) (trade name: YM50, available from Maruo Calcium Co., Ltd.; average particle size D50: 0.5 m) was used in place of the light calcium carbonate particles surface-treated with a fatty acid (YM23) of the resin composition (A) of Example 1 and the composition of the resin composition (A) containing the light calcium carbonate particles (YM50) was adjusted to those listed in Table 2 and Table 3.

Example 4

Printing paper of Example 4 was produced in the same manner as in Example 1 except that a polypropylene resin (FW) was further added to the resin composition (B) of Example 1 and the contents of the polypropylene resins (MA) and (FW) was adjusted to those listed in Table 2.

Example 5 and Comparative Example 3

Each of printing papers of Example 5 and Comparative Example 3 was produced in the same manner as in Example 1 except that the composition of the resin composition (B) of Example 1 was changed to those listed in Table 2 and Table 3.

Example 6

Printing paper of Example 6 was produced in the same manner as in Example 1 except that the composition of the resin composition (C) of Example 1 was changed to that listed in Table 2.

Example 7

Printing paper of Example 7 was produced in the same manner as in Example 1 except that heavy calcium carbonate particles (C7) (trade name: CALTEX 7, available from Maruo Calcium Co., Ltd.; average particle size D50: 1.0 μm; average particle size D100: 6.0 μm) was used in place of the heavy calcium carbonate particles (C5) of the resin composition (B) of Example 1 and the composition of the resin composition (B) was adjusted to that listed in Table 2.

Example 8 and Comparative Example 4

Each of printing papers of Example 8 and Comparative Example 4 was produced in the same manner as in Example 1 except that heavy calcium carbonate particles (1800) (trade name: SOFTON, available from Bihoku Funka Kogyo Co., Ltd.; average particle size D50: 2.0 µm; average particle size D100: 11.0 µm) was used in place of the heavy calcium carbonate particles (C5) of the resin composition (B) of Example 1 and the composition of the resin composition (B) was adjusted to those listed in Table 2 and Table 3.

Example 9

Printing paper of Example 9 was produced in the same manner as in Example 8 except that a polypropylene resin (FW) was further added to the resin composition (B) of Example 8 and the composition of the resin composition (B) was adjusted to that listed in Table 2.

Comparative Examples 5 and 6

Each of printing papers of Comparative Examples 5 and 6 was produced in the same manner as in Example 1 except that the machine-direction stretching ratio of the base layer (C) of Example 1 was changed to the area stretching ratio shown in Table 3

Comparative Example 7

Printing paper of Comparative Example 7 was produced in the same manner as in Comparative Example 2 except that the heavy calcium carbonate particles (C5) and the light calcium carbonate particles (YM23) were used as the filler of the resin composition (A) and the filler of the resin composition (C), respectively, of Comparative Example 2, the compositions of the resin compositions (A) and (C) were changed to those listed in Table 3, and the area stretching ratio was adjusted to that listed in Table 3 by changing the machine-direction stretching ratio of the base layer (C).

The physical properties of the printing papers of Examples and Comparative Examples were measured as described below.

Porosity

The porosity (%) of each of the layers was determined by a proportion of an area occupied by pores in a certain region of a cross section of the printing paper observed by an electron microscope. Specifically, an arbitrarily selected part of the printing paper which was to be the measurement target was cut, and this cut portion was embedded in an epoxy resin and solidified. Thereafter, this specimen was cut using a microtome, in a direction vertical to the direction of the printing paper surface, which was the measurement target. The specimen was attached to a specimen stage in a manner that the cut surface was to be observed. On the surface to be observed, gold or gold-palladium or the like was vapor-deposited. Pores of the printing paper were observed at an appropriately selected magnification at which the target was easily recognizable by an electron microscope (e.g., magnification of 500 times to 3000 times), and an image data was captured at the observed region. The image processing of the obtained image data was performed using an image analyzer, and the area percentage (%) of the pore portion in a certain region of each of the layers was determined by assessing the boundary between the layers. At least 10 arbitrarily selected positions were observed and the measurement values were averaged. The average value was defined as the porosity (%).

Average Pore Size

For the average pore size, using the image data obtained in the measurement of the porosity described above, at least 10 positions were arbitrarily selected and the dimensions of the pores in the machine direction (MD) of the observed film were measured. The measurement values were averaged and the average was defined as the average pore size.

Evaluation

The printing applicability and formability of the printing papers of Examples and Comparative Examples were evaluated as follows.

Oil-Based Offset Printing

Both sides of the printing paper were subjected to oil-based offset printing, and the printing applicability was evaluated for the obtained printed material.

For the oil-based offset printing, A3-Plus Size Offset Presses (device name: Ryobi 524GX, available from RYOBI MHI Graphic Technology Ltd.) and oil-based offset inks (trade name: Fusion-G MK black, indigo, red, transparent yellow, available from DIC Corporation) were used. The oil-based offset inks are commercially available as inks for pulp paper. Furthermore, for printing, a presensitized printing plate (trade name: XP-F, available from Fujifilm), blanket (trade name: D-3000, available from T&K TOKA Co., Ltd.), and powder (trade name: NIKKALYCO AS-100S, available from Nikka Limited) were used.

First, ink concentration was adjusted, and then printing was performed on one side of the printing paper for at least 200 sheets of the printing paper (first printing). The obtained printed materials were piled and stacked, allowed to stand still for 24 hours while no object was placed on the printed materials, and stored. At the time of adjustment of ink concentration, adjustment was made such that the supplied amount of dampening water was reduced to the minimum of a range in which scumming did not occur on the printing paper face. Then, an ink amount of each color was adjusted such that the ink concentration of a portion where only one color was printed in the printed pattern was to be in the range listed below.

Black: 1.75±0.1
Indigo: 1.45±0.1
Red: 1.35±1.0
Yellow: 1.00±0.5

The printed materials after the storage was set so that the printing order of the printed materials was to be identical to that of the first printing. Printing was performed on the other side of the printed material for at least 200 sheets of the printed materials (second printing). Adjustment of the dampening water before the printing, adjustment of the ink amount, and procedure of the storage were performed in the same manner as in the first printing.

At the time of printing, the temperature in the printing room was adjusted to 20 to 25° C., and the relative humidity was adjusted to 40 to 60%. For the first printing, a design including letters, figures, photographic images, and blank parts was used. For the second printing, a design including screen image and solid image of single color for each of black, indigo, red, and yellow. The printing of the colors was in the order of black, indigo, red, and yellow, and the printing speed was 8000 sheets/hr.

Printing Applicability: Gloss Ghosting

The single-colored solid image portion on the second printing side of the printed material, in which both sides were printed as described above, was observed after 1 day (after 24 hours) of the second printing. For the single colored solid image portion, a visually observable degree of the difference in color (lightness) of appearance between the portion that had been in contact with the printed layer of the first printing face and the portion that had not been in contact was evaluated based on the following criteria.

Good: Color difference could not be confirmed (acceptable for practical use)

Moderate: Some difference in color could be confirmed but was not noticeable (acceptable for practical use)

Marginal: Some difference could be confirmed and was somewhat noticeable (acceptable for practical use)

Poor: Difference was clearly confirmed and noticeable (not acceptable for practical use)

Printing Applicability: Ink Dryability

During the storage of the printed materials that had only undergone the first printing, one sheet was sampled from the stacked printed materials every hour. The solid printing portion of the sampled paper was pressed with a finger. Ink dryability was evaluated according to the following criteria, judging from the time at which the ink was no longer transferred to the fingertip (time required for set drying).

Good: Set-dried within 6 hours (acceptable for practical use)

Moderate: Set-dried within 12 hours (acceptable for practical use)

Marginal: Set-dried within 24 hours (acceptable for practical use)

Poor: Not set-dried within 24 hours (not acceptable for practical use)

Formability: Sheet Breakage

Judging from frequency of the sheet breakage during formation of the printing paper, the sheet breakage was evaluated as follows.

Good: No sheet breakage occurred even when production was performed continuously for 1 day (acceptable for practical production)

Marginal: Frequency of sheet breakage was once or twice when production was performed continuously for 1 day (acceptable for practical production)

Poor: Frequency of sheet breakage was three times or greater when production was performed continuously for 1 day (not acceptable for practical production)

Table 2 and Table 3 show the evaluation results.

TABLE 2

| | | | Example 1 | Example 2 | Example 3 | Example 4 | Example 5 | Example 6 | Example 7 | Example 8 | Example 9 |
|---|---|---|---|---|---|---|---|---|---|---|---|
| Antistatic layer | ST [mass %] | | 1.0 | 1.0 | 1.0 | 1.0 | 1.0 | 1.0 | 1.0 | 1.0 | 1.0 |
| Surface layer (A) | Thermoplastic resin | MA [mass %] | 47 | 30 | 47 | 47 | 47 | 47 | 47 | 47 | 47 |
| | | FW [mass %] | — | 17 | — | — | — | — | — | — | — |
| | Fillers | YM23 [mass %] | 53 | 53 | — | 53 | 53 | 53 | 53 | 53 | 53 |
| | | YM50 [mass %] | — | — | 53 | — | — | — | — | — | — |
| | Porosity [area%] | | 30 | 20 | 35 | 30 | 30 | 30 | 30 | 30 | 30 |
| | Average pore size [μm] | | 1.0 | 0.3 | 4.5 | 1.0 | 1.0 | 1.0 | 1.0 | 1.0 | 1.0 |
| Intermediate layer (B) | Thermoplastic resin | MA [mass %] | 55 | 55 | 55 | 35 | 40 | 55 | 55 | 55 | 40 |
| | | FW [mass %] | — | — | — | 20 | — | — | — | — | 15 |
| | Fillers | C5 [mass %] | 45 | 45 | 45 | 45 | 60 | 45 | — | — | — |
| | | C7 [mass %] | — | — | — | — | — | — | 45 | — | — |
| | | 1800 [mass %] | — | — | — | — | — | — | — | 45 | 45 |
| | Porosity [area %] | | 27 | 27 | 27 | 15 | 40 | 27 | 27 | 27 | 20 |
| | Average pore size [μm] | | 30 | 30 | 30 | 7 | 65 | 30 | 35 | 40 | 15 |
| Base layer (C) | Thermoplastic resin | MA [mass %] | 85 | 85 | 85 | 85 | 85 | 55 | 85 | 85 | 85 |
| | Fillers | C5 [mass %] | 15 | 15 | 15 | 15 | 15 | 45 | 15 | 15 | 15 |
| | Porosity [area %] | | 35 | 35 | 35 | 35 | 35 | 45 | 35 | 35 | 35 |
| | Average pore size [μm] | | 85 | 85 | 85 | 85 | 85 | 190 | 85 | 85 | 85 |
| Stretching ratio (A/B/C/B/A) | | | 9/9/40.5/9/9 | | | | | | | | |
| Printing applicability | Gloss ghosting | | Moderate | Marginal | Marginal | Marginal | Marginal | Moderate | Good | Good | Moderate |
| | Ink dryability | | Moderate | Marginal | Moderate | Moderate | Good | Good | Moderate | Good | Moderate |
| Formability | Sheet breakage | | Good | Good | Good | Good | Good | Good | Good | Good | Good |

TABLE 3

| | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Antistatic layer | ST [mass %] | | 1.0 | 1.0 | 1.0 | 1.0 | 1.0 | 1.0 | 1.0 |
| Surface layer (A) | Thermoplastic | MA [mass %] | 23.5 | 40 | 47 | 47 | 47 | 47 | 40 |
| | | FW [mass %] | 23.5 | — | — | — | — | — | — |
| | Fillers | YM23 [mass %] | 53 | — | 53 | 53 | 53 | 53 | — |
| | | YM50 [mass %] | — | 60 | — | — | — | — | — |
| | | C5 [mass %] | — | — | — | — | — | — | 60 |

TABLE 3-continued

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Intermediate layer (B) |  | Porosity [area %] | 15 | 40 | 30 | 30 | 30 | 30 | 40 |
|  |  | Average pore size [um] | 0.1 | 6.0 | 1.0 | 1.0 | 1.0 | 1.0 | 65.0 |
|  | Thermoplastic resin | MA [mass %] | 55 | 55 | 85 | 35 | 55 | 55 | 55 |
|  |  | FW [mass %] | — | — | — | — | — | — | — |
|  | Fillers | C5 [mass %] | 45 | 45 | 15 | — | 45 | 45 | 45 |
|  |  | C7 [mass %] | — | — | — | — | — | — | — |
|  |  | 1800 [mass %] | — | — | — | 65 | — | — | — |
| Base layer (C) |  | Porosity [area %] | 27 | 27 | 10 | 45 | 27 | 27 | 27 |
|  |  | Average pore size [μm] | 30 | 30 | 4 | 100 | 30 | 30 | 30 |
|  | Thermoplastic resin | MA [mass %] | 85 | 85 | 85 | 85 | 85 | 85 | 85 |
|  | Fillers | C5 [mass %] | 15 | 15 | 15 | 15 | 15 | 15 | — |
|  |  | YM23 [mass %] | — | — | — | — | — | — | 15 |
|  |  | Porosity [area %] | 35 | 35 | 35 | 35 | 15 | 45 | 5 |
|  |  | Average pore size [um] | 85 | 85 | 85 | 85 | 60 | 220 | 5 |
| Stretching ratio (A/B/C/B/A) |  |  | 9/9/40.5/9/9 | | | | 9/9/27/9/9 | 9/9/54/9/9 | 9/9/18/9/9 |
| Printing applicability |  | Gloss ghosting | Poor | Poor | Poor | Poor | Poor | Moderate | Poor |
|  |  | Ink dryability | Poor | Marginal | Marginal | Marginal | Marginal | Good | Marginal |
| Formability |  | Sheet breakage | Good | Good | Good | Marginal | Good | Poor | Good |

All of Examples 1 to 9 exhibit little gloss ghosting and achieved excellent ink dryability. No breakage occurred in the sheet, and continuous production was possible.

Meanwhile, for Comparative Examples 1 to 5 in which the average pore size of each of the layers was not in the predetermined range, gloss ghosting occurred. For Comparative Example 6 in which the average pore size of the base layer was large, no gloss ghosting occurred; however, breakage of sheet occurred, and it was difficult to produce continuously. Furthermore, for Comparative Example 7 in which the average pore size became larger in the order of the base layer, the intermediate layer, and the surface layer, gloss ghosting occurred.

What is claimed is:

1. A printing paper comprising a base layer; an intermediate layer; and a surface layer,
   the intermediate layer being arranged adjacent to the base layer and on the base layer, and the surface layer being arranged adjacent to the intermediate layer and on the intermediate layer,
   the base layer, the intermediate layer, and the surface layer each being a polyolefin-based resin film having fillers and pores, and is stretched in at least one direction,
   an average pore size of the surface layer being from 0.2 to 5 μm,
   an average pore size of the intermediate layer being from 5 to 70 μm and being greater than the average pore size of the surface layer, and
   an average pore size of the base layer being from 70 to 200 μm and being greater than the average pore size of the intermediate layer,
   and wherein:
   a content of the fillers in the surface layer is from 40 to 60 mass %,
   a content of the fillers in the intermediate layer is from 15 to 63 mass %, and
   a content of the fillers in the base layer is from 10 to 60 mass %.

2. The printing paper according to claim 1, wherein the intermediate layer contains fillers having a maximum particle size of 5 μm or greater.

3. The printing paper according to claim 1, wherein the intermediate layer contains a first polyolefin-based resin and a second polyolefin-based resin, wherein the first polyolefin-based resin has a greatest content of polyolefin-based resins in the intermediate layer, and the second polyolefin-based resin has a melting point lower than a melting point of the first polyolefin-based resin, and has a content in the intermediate layer of from 3 to 15 mass %.

4. The printing paper according to claim 1, wherein a porosity of each of the surface layer and the intermediate layer is from 10 to 50%, and a porosity of the base layer is from 20 to 60%.

5. The printing paper according to claim 1, wherein an average particle size of the fillers in the surface layer is from 0.1 to 0.9 μm, an average particle size of the fillers in the intermediate layer is from 0.5 to 10 μm, and an average particle size of the fillers in the base layer is from 0.5 to 10 μm.

* * * * *